United States Patent
Ng et al.

(10) Patent No.: US 11,789,602 B1
(45) Date of Patent: Oct. 17, 2023

(54) IMMERSIVE GALLERY WITH LINEAR SCROLL

(71) Applicant: SPATIAL SYSTEMS INC., New York, NY (US)

(72) Inventors: Peter Ng, San Francisco, CA (US); Wonkee KiM, Queens, NY (US); Jinha Lee, New York, NY (US); Anand Agarawala, New York, NY (US)

(73) Assignee: SPATIAL SYSTEMS INC., New York, NY (US)

( * ) Notice: Subject to any disclaimer, the term of this patent is extended or adjusted under 35 U.S.C. 154(b) by 0 days.

(21) Appl. No.: 17/722,987

(22) Filed: Apr. 18, 2022

(51) Int. Cl.
  *G06F 3/0485* (2022.01)
  *G06F 3/04817* (2022.01)
  *G06F 3/04842* (2022.01)

(52) U.S. Cl.
  CPC ........ *G06F 3/0485* (2013.01); *G06F 3/04817* (2013.01); *G06F 3/04842* (2013.01)

(58) Field of Classification Search
  CPC . G06F 3/0485; G06F 3/04817; G06F 3/04842
  See application file for complete search history.

(56) References Cited

U.S. PATENT DOCUMENTS

| | | | | |
|---|---|---|---|---|
| 6,344,836 B1* | 2/2002 | Suzuki | ................... | G06F 3/1423 345/158 |
| 7,574,381 B1* | 8/2009 | Lin-Hendel | ........ | G06Q 30/0601 705/26.9 |
| 8,191,001 B2* | 5/2012 | Van Wie | ................. | G06T 19/20 707/726 |
| 8,397,168 B2* | 3/2013 | Leacock | ............. | G06F 3/04815 715/764 |
| 10,593,105 B2* | 3/2020 | Singh | ...................... | G06T 17/00 |
| 11,182,467 B1* | 11/2021 | Medina | .................... | G06F 3/147 |
| 11,185,774 B1* | 11/2021 | Goldstein | .......... | H04N 5/23238 |
| 11,228,436 B1* | 1/2022 | Foley | .................... | H04L 9/3213 |
| 11,410,570 B1* | 8/2022 | Yang | .................... | H04L 67/568 |
| 2005/0030309 A1* | 2/2005 | Gettman | ............... | G06F 16/954 345/419 |
| 2009/0254843 A1* | 10/2009 | Van Wie | ............... | H04L 67/131 707/999.005 |
| 2010/0257450 A1* | 10/2010 | Go | ...................... | G06F 3/04815 715/788 |

(Continued)

OTHER PUBLICATIONS

Trustnodes. (2021). NFT Boom Rides the Decentraland Metaverse, [retrieved on Aug. 26, 2022], Retrieved from the Internet: https://www.trustnodes.com/2021/09/25/nft-boom-rides-the-decentraland-metaverse. (Year: 2021).*

(Continued)

*Primary Examiner* — Jeremy L Stanley
(74) *Attorney, Agent, or Firm* — Sterne, Kessler, Goldstein and Fox P.L.L.C.

(57) ABSTRACT

Disclosed herein are various embodiments for a system for providing an immersive gallery with linear scroll. An embodiment operates by providing a navigation view of a gallery of a plurality of two-dimensional images displayed in an immersive interface and an avatar. A command is received to switch from the navigation view to a linear view of the plurality of two-dimensional images. A first image of the plurality of two-dimensional images is selected to provide via the linear view responsive to the command. The linear view of the first image including a zoomed in version of the first image is provided.

20 Claims, 9 Drawing Sheets

(56) References Cited

U.S. PATENT DOCUMENTS

| | | | |
|---|---|---|---|
| 2010/0332998 A1* | 12/2010 | Sun | G06F 3/04815 715/757 |
| 2010/0333031 A1* | 12/2010 | Castelli | G06F 16/95 715/848 |
| 2011/0063287 A1* | 3/2011 | McNeill | G06F 3/011 345/419 |
| 2011/0316888 A1* | 12/2011 | Sachs | G06F 3/0485 345/173 |
| 2012/0124471 A1* | 5/2012 | Gusky | H04W 4/21 715/705 |
| 2013/0212228 A1* | 8/2013 | Butler | H04L 65/61 709/219 |
| 2015/0178409 A1* | 6/2015 | Kernan | G06F 16/904 707/722 |
| 2015/0245199 A1* | 8/2015 | Blitzstein | H04W 12/02 455/411 |
| 2016/0035016 A1* | 2/2016 | Spio | G06Q 50/01 705/27.2 |
| 2016/0330379 A1* | 11/2016 | Lee | H04N 5/23216 |
| 2016/0364915 A1* | 12/2016 | Smith | G06T 13/80 |
| 2017/0078654 A1* | 3/2017 | Facin | G06F 3/011 |
| 2017/0182406 A1* | 6/2017 | Castiglia | A63F 13/213 |
| 2017/0262247 A1* | 9/2017 | Yoganandan | G06F 3/1446 |
| 2018/0077648 A1* | 3/2018 | Nguyen | H04L 51/18 |
| 2018/0109732 A1* | 4/2018 | Jang | G06F 3/04845 |
| 2018/0330432 A1* | 11/2018 | Mazor | G06Q 20/12 |
| 2018/0350144 A1* | 12/2018 | Rathod | H04W 4/021 |
| 2019/0005717 A1* | 1/2019 | Singh | G06T 15/80 |
| 2019/0060742 A1* | 2/2019 | Moon | G06F 3/011 |
| 2019/0079599 A1* | 3/2019 | Lee | G06F 3/0346 |
| 2019/0259204 A1* | 8/2019 | Park | G06Q 30/02 |
| 2020/0005284 A1* | 1/2020 | Vijayan | H04L 63/08 |
| 2020/0219323 A1* | 7/2020 | Varshney | H04L 51/52 |
| 2020/0365258 A1* | 11/2020 | Langer | G16H 40/20 |
| 2021/0241650 A1* | 8/2021 | Schlesinger | G09B 19/00 |
| 2021/0287195 A1* | 9/2021 | Prakash | G06Q 20/308 |
| 2021/0365909 A1* | 11/2021 | Shiina | G06Q 20/381 |
| 2021/0377052 A1* | 12/2021 | Brown | H04L 9/50 |
| 2021/0397390 A1* | 12/2021 | Li | G06F 3/0484 |
| 2022/0173893 A1* | 6/2022 | Basu | H04L 9/3297 |
| 2022/0201247 A1* | 6/2022 | Lehtiniemi | G06T 3/60 |
| 2022/0222364 A1* | 7/2022 | Roberts | H04L 9/3297 |
| 2022/0239495 A1* | 7/2022 | Norton | H04L 9/0872 |
| 2022/0258059 A1* | 8/2022 | Murein | A63F 13/79 |
| 2023/0018262 A1* | 1/2023 | Watanabe | G06F 3/0481 |

* cited by examiner

FIG. 9

IMMERSIVE GALLERY WITH LINEAR SCROLL

BACKGROUND

Most systems only allow you to view two-dimensional images one at a time. For example, if a user has fifteen image files the user wants to view, the only way to view these images is by opening each file, and individually viewing each one. This process is both time consuming and uninteresting, as well as unhelpful for a user who wants to view all of his images files together and share them with others.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Most systems only allow you to view two-dimensional images one at a time. For example, if a user has fifteen image files the user wants to view, the only way to view these images is by opening each file, and individually viewing each one. This process is both time consuming and uninteresting, as well as unhelpful for a user who wants to view all of his images files together and share them with others.

Figure 1:
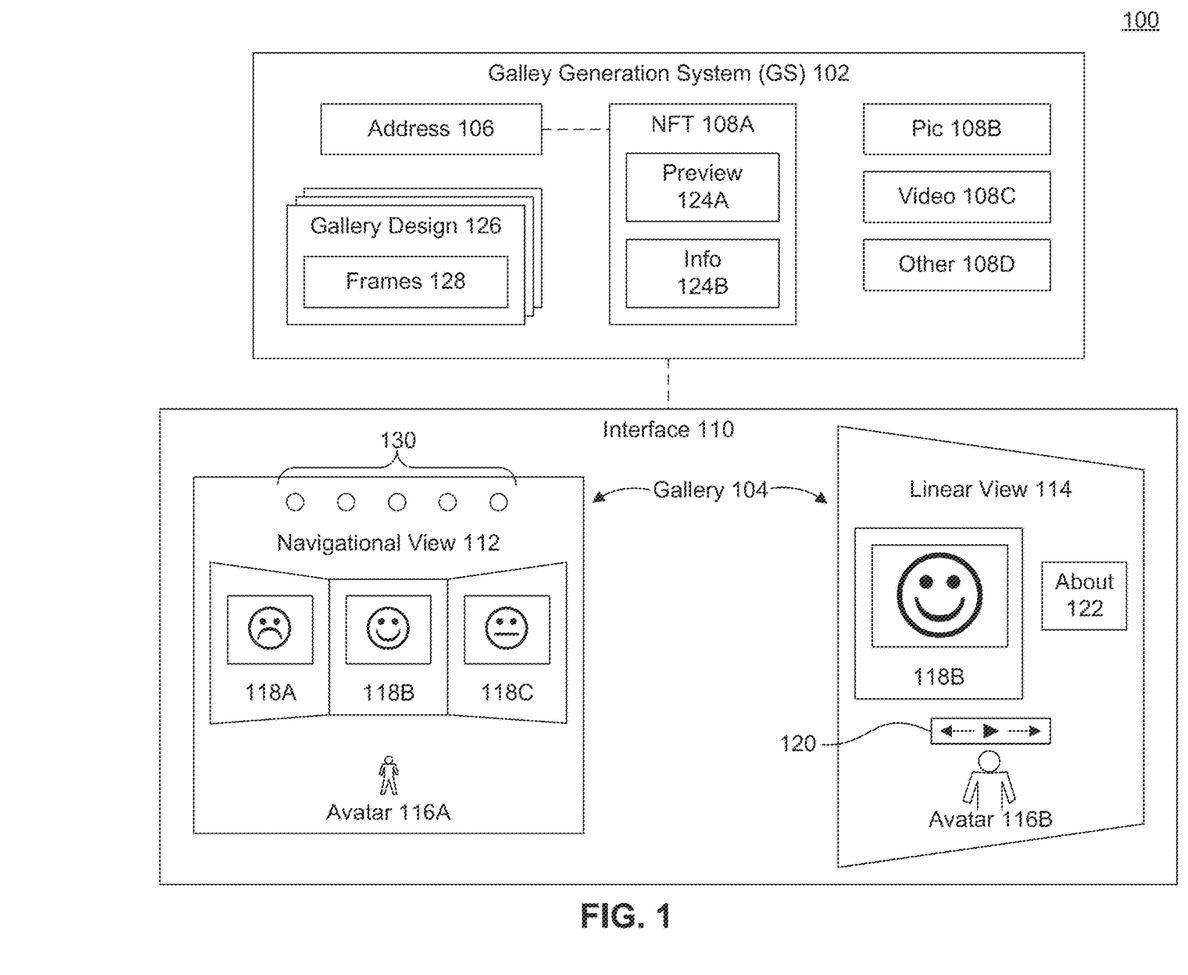
FIG. 1 is an example of a system for providing an immersive gallery with linear scroll, according to some embodiments.

FIG. 1 is an example of a system 100 for providing an immersive gallery with linear scroll, according to some embodiments. A gallery generation system (GS) 102 may automatically generate a gallery 104 of images from one or more files or images.

In some embodiments, GS 102 may receive an address 106 indicating a location of one or more files for which a gallery 104 is to be generated. The files may include any combinations or types of files, including but not limited to a non-fungible token (NFT) 108A, a pic 108B, a video 108C, or other 108D (including a gif (graphics interface format) file). These examples are generally referred to herein together as file 108 or files 108, which may reference any or all of the various file types (108A-D) for which a gallery 104 may be generated or that may be used to populate a gallery design 126. Each file 108 may include visual content that is displayed in a gallery 104 on an interface 110.

Interface 110 may be the screen or interface on any computing device, including but not limited to: a tablet computer, mobile phone, laptop, desktop, television, or any SMART or Internet of Things (IoT) device. In some embodiments, interface 110 may be the headset or screen that enables a user to interact with gallery 104 in an augmented or virtual reality type computing environment.

Gallery 104 may provide an immersive or three-dimensional viewing experience of two-dimensional images from files 108 for a user or viewer of an interface 110. In some embodiments, gallery 104 may be similar to a digital version of an art gallery in which various digital images (from files 108) are displayed in frames 128 around the gallery 104. Frames 128 may indicate a number, size, shape, location, and/or visibility or permission characteristics of various images (corresponding to files 108) for a particular gallery design 126 from which a gallery 104 is generated.

Gallery design 126 may include a preconfigured format of a gallery 104. In some embodiments, different gallery designs 126 may include different numbers of frames 128. In some embodiments, GS 102 may generate a gallery 104 for a set of files 108 based on how much images are to be displayed. For example, different gallery designs 126 may be of different sizes (e.g., configured to display different numbers of frames 128). Then, based on the number of images to be displayed, GS 102 may select the corresponding gallery design 126 that can hold or display at least the required number of images. In some embodiments, if a gallery is configured to display ten frames 128, and only eight images are available for display, GS 102 may remove the additional two frames 128 from gallery 104, or may visually display empty frame slots where new images may be added.

In some embodiments, GS 102 may enable a user to view gallery 104 through either a navigational view 112 or a linear view 114. The navigational view 112 may allow a user to view of portions of the gallery 104, as if they are walking through the gallery 104 (e.g., using avatar 116A). By providing the navigational view 112, GS 102 may enable a user to see multiple images 108 that are displayed across one or more digital walls or surfaces at the same time on interface 110. The user may control avatar 116A to move around the gallery 104 and to change what images 118A-C are displayed in the navigational view 112.

Which images 118A-C (generally referred to herein as images 118) of the gallery 104 that are visible on the interface 110 will depend on both the location of the avatar 116A in the gallery 104 and a direction in which the head and/or body of the avatar 116A is facing. In some embodiments, GS 102 may always provide a front facing view of the avatar 116A so that the user can see what the avatar 116A is seeing and may enable a user to change the head or facing direction of avatar 116A without moving the avatar 116 around the gallery 104, similar to looking around while standing in one location. This may cause GS 102 to display different images 118 and/or views of the gallery based on the direction in which the avatar 116A is facing.

The linear view 114 may provide a different way for a user to view and navigate the gallery 104 (e.g., the same gallery 104 that is also accessible via the navigational view 112). In some embodiments, the linear view 114 may provide a use with a close up or zoomed in view of one or more selected images 118. In some embodiments, linear view 114 may provide an enhanced or different viewing and navigational experience relative to the navigational view 112 of the same gallery 104 and images 118. For example, the navigational view 112 may enable a user to move avatar 116A around a gallery 104 and view the gallery 104 with a 360 degree rotational turns for immersive or three-dimensional navigational experience for a user through the gallery 104.

By contrast, linear view 114 may provide a horizontal (and/or vertical viewing experience) or two-dimensional view of the gallery 104. In some embodiments, GS 102 may disable moving the avatar 116B around the gallery 104, and may instead move the images 118 of the gallery 104 around the avatar 116B through directional (e.g., horizontal, vertical, and/or diagonal scrolling). For example, the user may select the left arrow, and rather than moving avatar 116B left (as may be done in the navigational view 112) GS 112 may load the next image 108 that is displayed in the gallery 104 to the left of the current image 118B. In the example illustrated, image 118A may be loaded into the linear view 114 upon a selection of the left arrow from the navigation box 120.

Though not illustrated in the example, in some embodiments, the user may scroll up and down or even diagonally in the linear view 114, which may depend on the gallery design 126 of the particular gallery 104 and the arrangement of images 118 on a particular digital wall of the gallery 104 being currently viewed through linear view 114.

Linear view 114 may provide a navigational advantage in which the user is able to view more details on a selected image 118B and/or easily scroll through various images 118 of the galley 104 after image 118, without necessarily needing to direct the avatar 116B around the immersive environment of gallery 104.

In some embodiments, GS 102 may enable a user to toggle between navigational view 112 and linear view 114 while viewing the same gallery 104 and even the same image(s) 118 in the gallery 104. For example, in navigational view 112, a user may select image 118B which may cause GS 102 to switch into linear view 114. Or, for example, the user may speak or type a command to switch or toggle back and forth between navigational view 112 and linear view 114.

In some embodiments, if user places avatar 116A in front of a particular image 118B in navigational view 112 for a threshold period of time (e.g., 3 seconds), then GS 112 may automatically switch or toggle to linear view 114. Then, from linear view 114, GS 112 may switch or toggle back to navigational view 112 upon receipt of a navigation command or another command directing a change to navigational view 112.

In some embodiments, if a user entered linear view 114 while viewing a first image 118 in a first location in gallery 104 (e.g., as may be accessible via navigational view 112), and the user scrolled to a second image in a second location in gallery while in linear view 114, then when the user requests to switch back to navigational view 112, GS 102 may direct avatar 116A to either the first location, the second location, or may allow the user to select whether the avatar 116A should be it the first location or the second location.

In some embodiments, linear view 114 may include a single image 118B (which may correspond to the same image 118B in the navigational view 112), and a user may use a navigation panel 120 to scroll through different images in a linear (e.g., horizontal and/or vertical fashion without needing to direct the avatar 116B around the gallery 104). In the illustrated example, a navigation panel 120 may be displayed or accessible via linear view 114. The left and right arrows of navigational panel 120 may cause GS 102 to load the images 108 to the left (image 118A) and right (image 118C) of the main displayed image 118B (or images), as they are arranged in the gallery 104 (and would be evident in the navigational view 112). GS 102 may maintain a consistency in the ordering of images 118A-C between linear view 114 and navigational view 112 such that the user feels as if they are viewing the same gallery 104 (with the same ordering or arrangements of images 118).

The play button in the navigation panel 120 may cause GS 120 to switch to a theatre view in which avatar 116A is automatically directed around gallery 104 in a navigational view 112. The user may then move the avatar (e.g., using arrow buttons or voice commands or other commands) to switch out of the theatre mode back into normal navigational view 112.

If user has reached the last image (e.g., 118C) in a particular gallery 104 in linear view 114, GS 102 may provide the first image 118A in the linear view 114 in an infinite scroll type fashion and/or may provide a notification to the user that the last image 118 has been viewed, or may disable further scrolling in that particular direction. In some embodiments, may display suggested other galleries 130 that the user may select to view different from the current gallery 104.

The suggested galleries 130 may include galleries of artists or organizations the user is following on social media or galleries on subjects related to the current gallery. In the example illustrated, the user may select any of the circles to navigate to a different gallery 104, which GS 102 may load upon selection. In some embodiments, the suggested galleries 130 may be available in navigational view 112, linear view 114, or both. In some embodiments, each circle of the suggested galleries display element 130 may include a name, image, or preview of the gallery corresponding to the circle (or other shape).

In some embodiments, linear view 114 may include a similar display element 130, which enables the user to hop around different images 118 of the current gallery 104. This could be useful, for example, if the user is viewing image number 200 of a 300 image gallery 104 and wants to skip to the first or two-hundred and fifteenth image in linear view 114.

In some embodiments, the linear view 114 may include an about 122 panel, plaque, or display area that provides additional information about the corresponding image 118B displayed in linear view 114. In some embodiments, this information from about 122 may not be visible or legible in the navigational view 112. The about 122 section may include any information about the image 118B, including but not limited to: ownership information, purchase history, date created, date sold, the name of the creator, image name, the source, the size, file size, file type, etc.

One of the example file types that can be displayed in a gallery 104, is a NFT 108A. NFT 108A may be an image, short video, animation, or gif type file that is owned by a particular individual or organization. An NFT 108A may include both a preview 124A and an info 124B portion. The preview 124A may include a publicly available, often free to use, image or preview of the underlying NFT 108A. The info 124B may include various information about the NFT 108A including, for example, creator, chain of ownership, filename, price, etc.

In some embodiments, the NFT 108A may be stored on a blockchain, however with an address 106 to a blockchain or NFT wallet, GS 102 may generate a gallery 104 from one or more NFTs 108A accessible from the address 106. In some embodiments, a collector of NFTs 108A may provide one or more addresses indicating where their NFTs 108A are stored, and GS 102 may automatically select a gallery design 126 and generate one or more galleries 104 for the NFTs 108A.

In some embodiments, GS 102 may enable a user to change which gallery design 126 is being used to display their NFTs 108A. In some embodiments, this change feature may only be accessible to the registered owner of the NFTs, but not to any visitors or viewers of the gallery 104. In some other embodiments, each visitor or viewer may be provided an option of changing the gallery design 126 for the present gallery 104 they are using, but may be prohibited from changing the arrangement or ordering of the displayed images 118 (unless that user is the registered owner, gallery creator, or has otherwise been granted permissions).

In some embodiments, address 106 may correspond to an address of a generated gallery 104, and a user may share address 106 with other users who may view or access gallery (with various granted permissions) via a web browser, mobile app, or other interface 110.

In some embodiments, an image 118 may include a video 108C. Video 108C may include any video clip that is playable, and to which GS 102 has access to either the underlying video file or website address of the video 108C (such as a YOUTUBE video). In some embodiments, the video 108C may only be playable (with or without sound) from linear view 114 (e.g., using the play button from the navigation panel 120), while a thumbnail of the video 108C (along with a video indication) may appear in navigational view 112. In some embodiments, the video may be playable from either navigational view 112 or linear view 114 (with or without sound).

In some embodiments, address 106 may include a website address. Upon receiving the website address 106, GS 102 may extract or retrieve image files 108A, order them, and arrange them in a gallery 104 which may be accessible via both navigational view 112 and linear view 114, which may provide a completely new viewing experience for the website.

Figure 2:
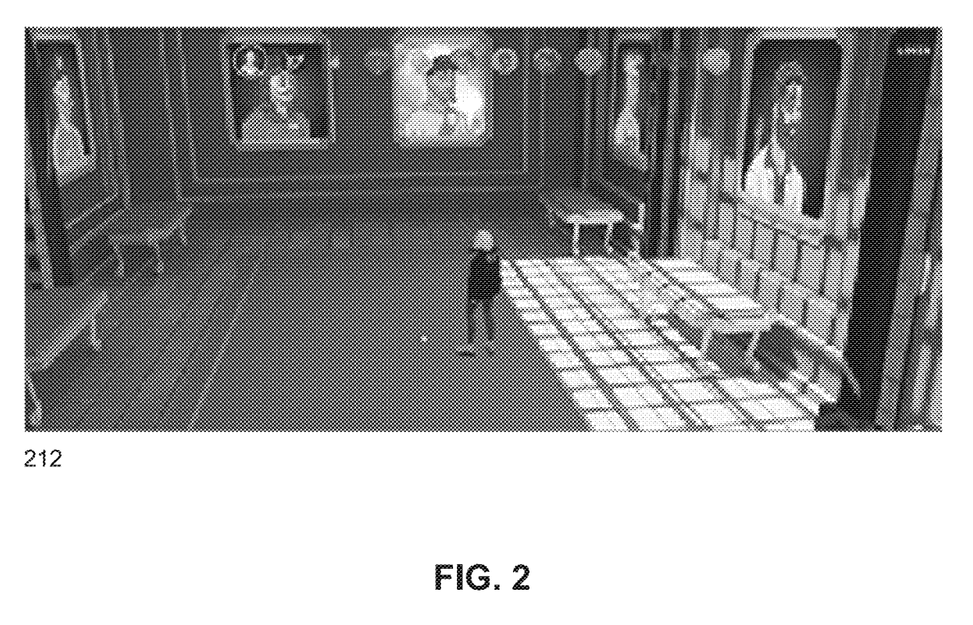
FIG. 2 is an example screenshot of a navigational view, according to some embodiments.

FIG. 2 is an example screenshot 214 of a navigational view 112, according to some embodiments. In the screenshot 214 an avatar is displayed in a gallery with various images, and GS 102 may enable a user to move the avatar around the gallery, change the direction in which the avatar is facing, and even select any of the images, which may cause a switch into linear view 114. Also, as illustrated, a recommended galleries display element 130 is displayed at the top as a series of circles with various gallery images or previews displayed within each circle.

Figure 3:
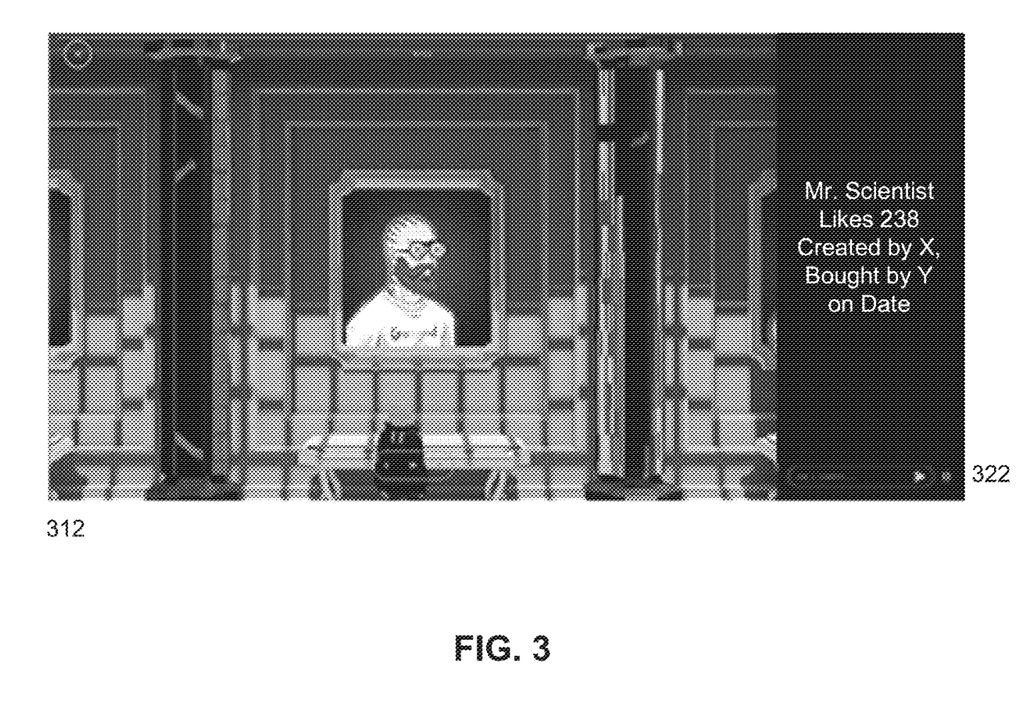
FIG. 3 is another example screenshot of a navigational view, according to some embodiments.

FIG. 3 is another example screenshot 314 of a navigational view 312, according to some embodiments. In the screenshot 314 may illustrate the movement of an avatar in front of a particular painting or image. In this navigational view, the user may be able to see more details of the image, however GS 102 still may enable a user to move the avatar around the gallery, change the direction in which the avatar is facing, and even select any of the images, which may cause a switch into linear view 114.

In some embodiments, causing the avatar to remain in front of a particular image for a threshold period of time (e.g., 3 seconds), may cause the about panel 322 to appear with information about the image being viewed. In the example illustrated, this information includes a title, social media likes, who it was created by, who purchased it, and when it was purchased.

Figure 4:
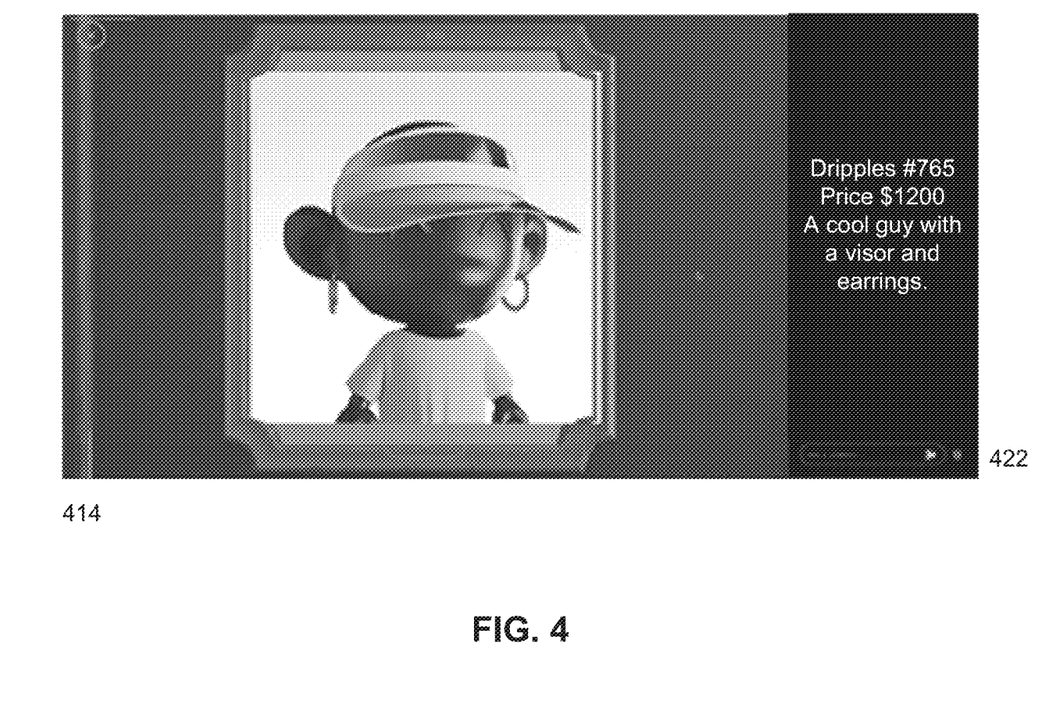
FIG. 4 is an example screenshot of a linear view, according to some additional embodiments.

FIG. 4 is an example screenshot 414 of a linear view 114, according to some additional embodiments. In this example, movement around the gallery by the avatar may be disabled, but the user may scroll left or right to view the various images displayed in the gallery (without the need to move the avatar). In the example, illustrated an about panel 422 may include information such as a title, a purchase or for sale price, and a description of the image or NFT 108A.

Figure 5:
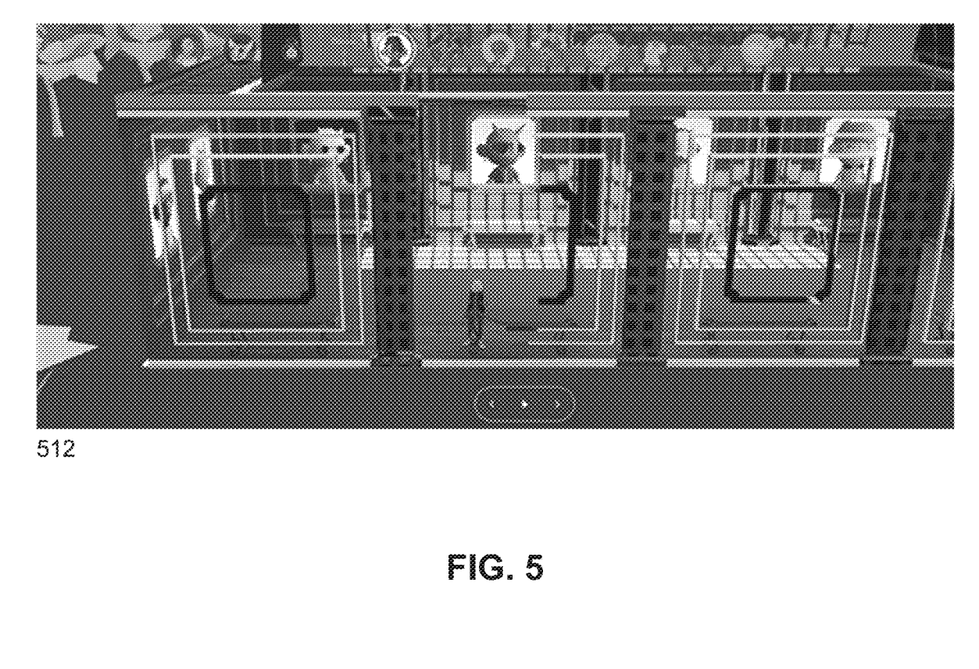
FIG. 5 is an example screenshot of a navigational view with plane clipping, according to some embodiments.

FIG. 5 is an example screenshot 512 of a navigational view 112 with plane clipping, according to some embodiments. In the example illustrated, GS 102 may perform plane clipping in which any gallery walls, images, floors, ceilings, or other visual obstructions that may prevent the user from seeing the avatar on the screen may be clipped. Clipping may include temporary removing or making translucent any objects that would obstruct the viewing the avatar and/or the view in the direction the avatar is facing.

In the example illustrated, the camera angel may be from outside the gallery or beyond a wall. As a result, GS 102 may clip the near-side gallery wall and any images that were displayed on the near-side gallery wall so that the avatar and its directional view of the far side of the gallery may remain visible to the user via the interface 110.

Figure 6:
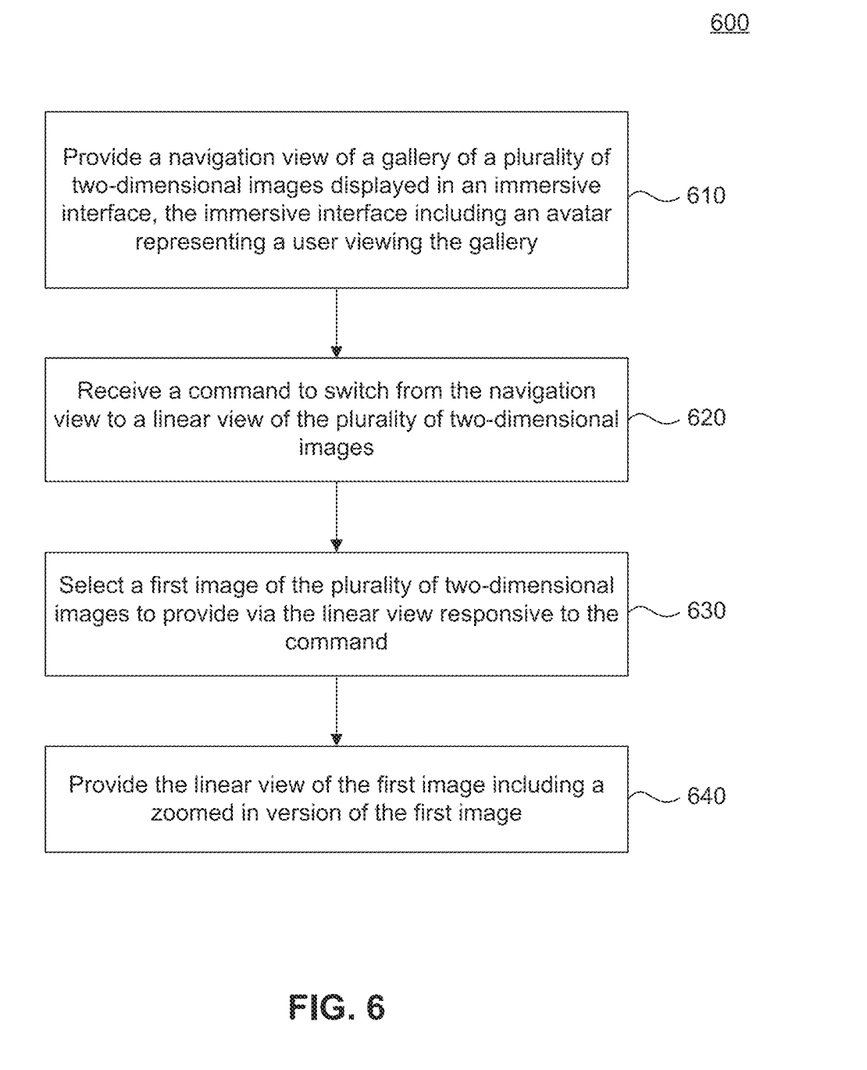
FIG. 6 is a flowchart illustrating example operations for a system for providing an immersive gallery with linear scroll, according to some embodiments.

FIG. 6 is a flowchart 600 illustrating example operations for a system for providing an immersive gallery with linear scroll, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to the figures.

In 610, a navigation view of a gallery of a plurality of two-dimensional images is provided for display in an immersive interface, the immersive interface including an avatar representing a user viewing the gallery. For example, GS 102 may provide navigational view 112 of gallery 104 via interface 110. The gallery 104 may include a number of different images 118 displayed which could include a preview 124A of various NFTs 108A belonging to one or more users who provide an address 106 of an NFT wallet. In the navigational view 112, the user may move the avatar 116A around the gallery 104, changing both the location of the avatar 116A within the gallery 104 and its directional view of the various images 118 within the gallery 104, which may include looking at the ceiling or floor of the gallery 104 as well.

In 620, a command to switch from the navigation view to a linear view of the plurality of two-dimensional images is received. For example, GS 102 may receive a mouse click or other selection of image 118B which may cause interface 110 to switch from navigational view 112 to linear view 114.

In 630, a first image of the plurality of two-dimensional images is selected to provide via the linear view responsive to the command. For example, GS 102 may select image 118B (which may have been indicated or selected by the user or may have been the closest image 118A-C to the front directional view of the avatar 116A when the command to switch was received) for display in the linear view 114.

In 640, the linear view of the first image comprising a zoomed in version of the first image. For example, as illustrated in linear view 114, the user may be able to see a zoomed in version of the selected image 118B. In addition, linear view 114 may include additional information not available or legible while in navigational view 112, in the form of an about panel 122. While in linear view 114, navigation of the avatar 116B may be disabled, and navigation may correspond to changing which image(s) 118 are displayed for the user in the interface 110 during the display of the linear view 114. In some embodiments, GS 102 may provide the navigational view 112 of gallery 104 with avatar 116A navigation enabled, or the linear view 114 of the gallery 104 with image scroll enabled (but avatar 116B navigation disabled), and may enable the user to toggled between either view at any time, but would not simultaneously display both navigational view 112 and linear view 114 on the interface 110.

Figure 7:
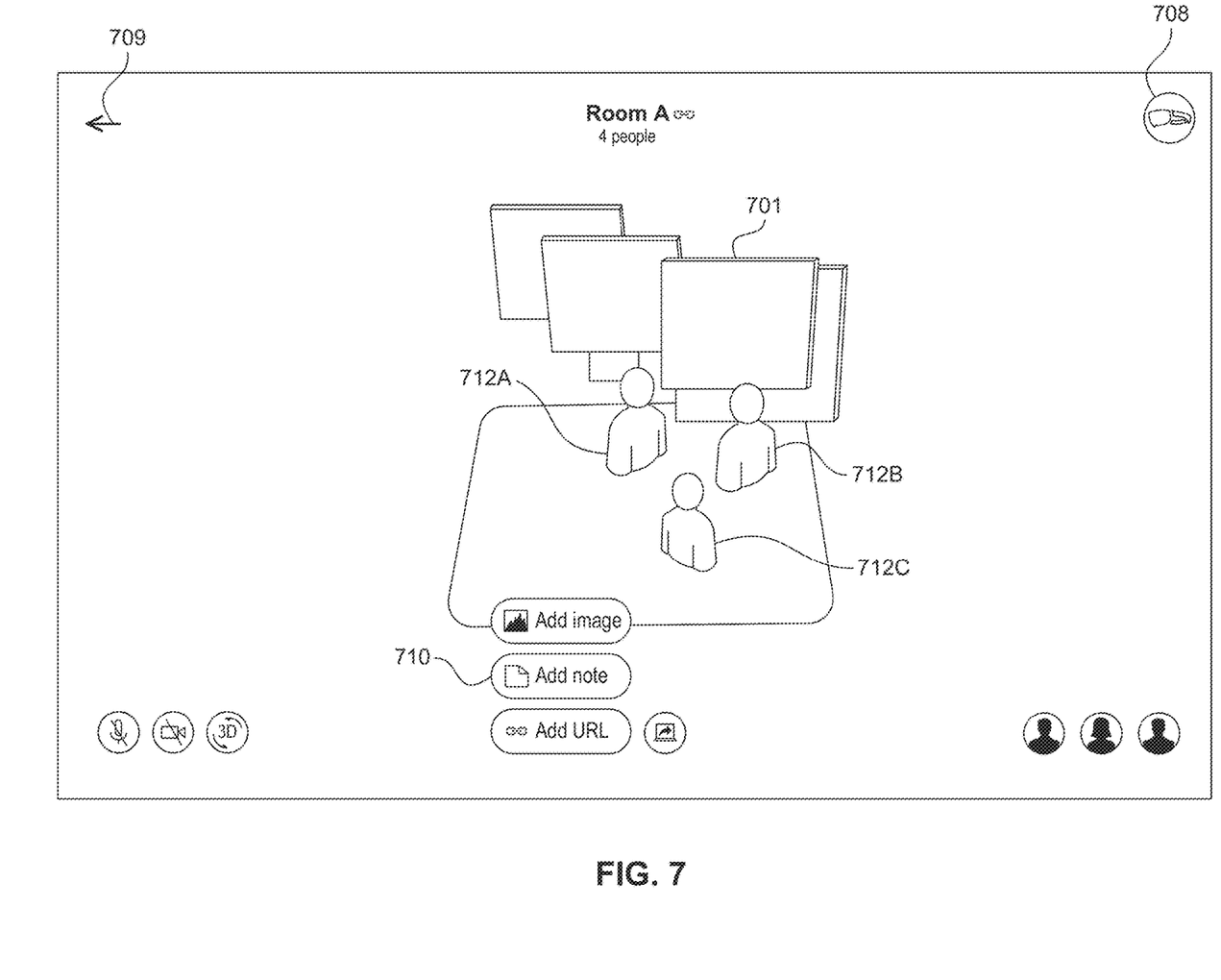
FIG. 7 is example screen display of a spectator view including a content-drop menu, according to some embodiments.

FIG. 7 is example screen display of a spectator view including a content-drop menu, according to some embodiments. The screen display provided in FIG. 7 is merely exemplary, and one skilled in the relevant art(s) will appreciate that many approaches may be taken to provide a suitable screen display in accordance with this disclosure.

Content menu 710, an example contextual menu, may allow a user to upload content from their mobile device, laptop computer, or other computing device into the AR meeting space. Content menu 710 may be accessed by a user engaging drop-content button 705. For example, a user may add an image or photograph from their device, copy a link into the AR meeting space, or add a sticky note as a digital object into the AR meeting space. In another embodiment, the content menu 710 may be expanded from and/or collapsed into a menu icon as described herein.

Avatars 712A-C may be representations of users active in an AR meeting space. Avatars 712 may uniquely identify and distinguish a user in the system from other users, allowing the viewing user to easily determine the identity of the user in the AR meeting space, on the AR meeting space launcher, or elsewhere in the AR system. Numerous approaches may be taken to create an avatar in the AR meeting space. In one embodiment, a user may create an avatar manually that represents their digital selves. In another embodiment, a user may upload an image and the image may be displayed as the user in the AR meeting spaces. In another embodiment, a video feed may be captured, e.g., by a webcam or camera on a mobile device, and the video feed placed in the AR meeting space to represent the user. In another embodiment, a mobile device may use a real-time face capture, e.g., using infrared, and AR/NR cloud system may assemble this into a digital representation in the AR meeting space that moves with the users facial expressions.

Figure 8:
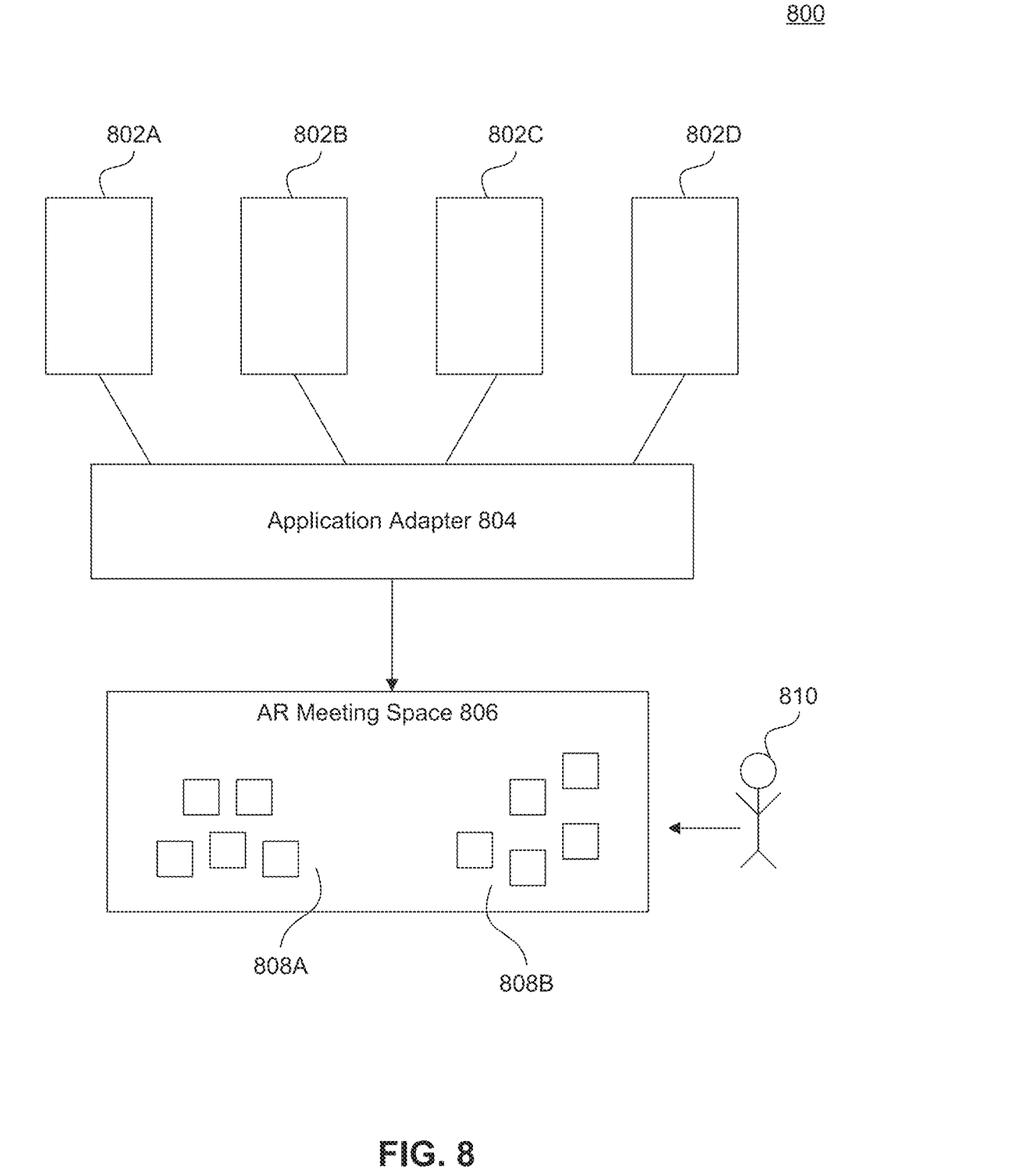
FIG. 8 is a block diagram of AR environment, according to some embodiments.

FIG. 8 is a block diagram of AR environment 800, according to some embodiments. Any operation herein may be performed by any type of structure in the diagram, such as a module or dedicated device, in hardware, software, or any combination thereof. Any block in the block diagram of FIG. 8 may be regarded as a module, apparatus, dedicated device, general-purpose processor, engine, state machine, application, functional element, or related technology capable of and configured to perform its corresponding operation(s) described herein. AR environment 800 may include media sources 802, application adapter 804, AR meeting space 806, three-dimensional representation 808, and user 810.

Media sources 802 may include social media, news feeds, web sites, email feeds, search results, and many other media types that are capable of providing structured data to AR/VR cloud system 206 for representation in an AR meeting space in three dimensions. Examples of social media may include feeds from FACEBOOK, INSTAGRAM, TWITTER, etc. Examples of web sites include news sites, such as THE WASHINGTON POST or THE NEW YORK TIMES, or any other web site available via the world wide web or other hypertext transfer protocol. Media sources may provide an RSS feed that may be accessed by AR/VR cloud system to pull/retrieve information from the media source. Such an RSS feed may be filtered to include information relevant to a particular user or subset of users within the AR system. An email feed may be accessed through a suitable email protocol, e.g., SMTP, POP3, etc.

Application adapter 804 may transform structured data, include models, received from the media source into a three-dimensional representation. Application adapter 804 may identify a source of the media and deploy a customized, enhanced adapter if the source is known and such an enhanced adapter exists. Application adapter 804 may employ a default adapter where the source and/or type is not known. A default adapter may provide baseline interaction techniques by representing the structured data in a simplistic fashion.

To transform the data, application adapter 804 may identify content provided by the media source while dividing the content into appropriate sections or groups. For example, in an RSS feed, application adapter 804 may divide information "<item>" tags into separate sections. For another example, for a web page, application adapter 804 may break down a particular web page into sections based on <iframe> tags, <section> tags, etc. Application adapter 804 may extract from the structured data images, videos, sound files, etc. to be associated/displayed with the determined content and/or sections.

By grouping the received data into sections that may be manipulated, application adapter 804 may select an appropriate three-dimensional interaction model to apply to the three-dimensional representation. For example, if the media source is a news feed, a three-dimensional representation may be displayed that is tailored to allow users to interact with news feed. In another example, if the media source is a WIKIPEDIA page, then an appropriate three-dimensional representation may be provided that is specific to WIKIPEDIA entries. Such an example is discussed above with referenced to FIG. 6A. The breadth and scope of functionality that is available to users when viewing the three-dimensional representation may vary according to the type of media source being viewed. Advanced techniques to sort, group, search, organize, view, etc. data may be available in three dimensions that are not available in two dimensions.

Application adapter 804 may be further enhanced to apply particularized expectations about a specific media source to derive additional information to include in the three-dimensional representation. For example, a particularized adapter may be deployed to parse a NEW YORK TIMES news feed that differs from a particularized adapter deployed to a comparable WASHINGTON POST news feed. Such an enhanced application adapter may gather additional information from the structured data provided by the media source and render incorporate that information into the three-dimensional representation.

AR meeting space 806 is an augmented reality meeting space, as described in detail above. Application adapter 804 may provide a three-dimensional representation to AR/VR cloud system 206 to recreate in AR Meeting Space 806.

3D representations 808, such as 3D representation 808A and 808B may be displayed in AR meeting space 806 to represent the structured data received from media sources 802 and transformed by application adapter 804. Various media sources are described throughout this disclosure specifically with respect to their representation in AR meeting spaces in three dimensions, e.g., as 3D representations 808.

These three-dimensional representations are merely exemplary, but provide suitable examples of three-dimensional representations of social media feeds, web pages, and search results. Additional three-dimensional representations may be developed to display other media sources, such as email feeds, tasklists, and any other suitable structured data that may be received from an external source and represented in three dimensions in an AR meeting space.

User 810 may view three-dimensional representations 808 in AR meeting space 806 using an AR headset, or in other embodiments, a mobile device or laptop computer.

Figure 9:
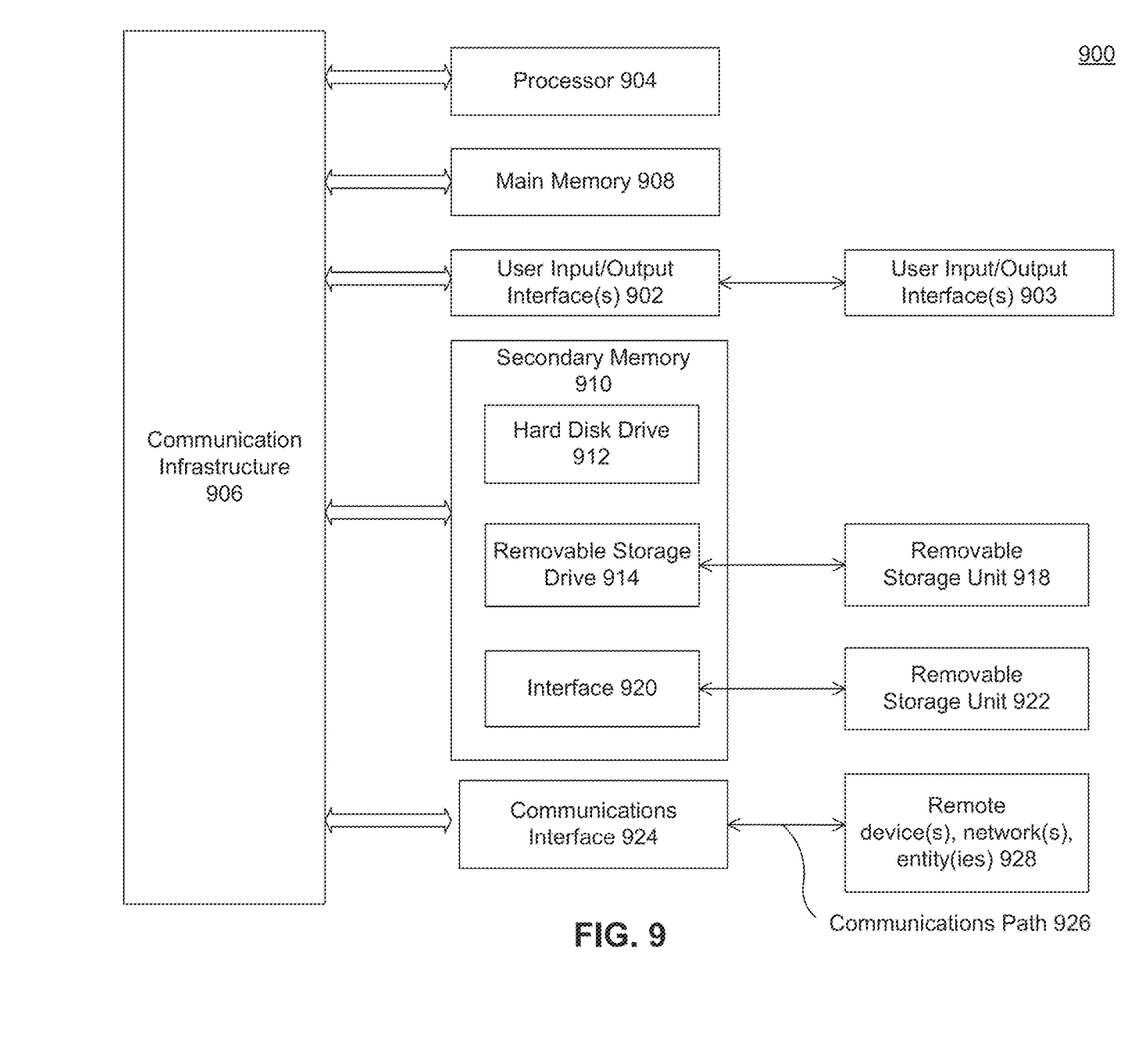
FIG. 9 is an example computer system useful for implementing various embodiments.

FIG. 9 is an example computer system useful for implementing various embodiments.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
providing a navigation view of a gallery of a plurality of two-dimensional images displayed in an immersive interface, the immersive interface including an avatar representing a user viewing the gallery, wherein the navigation view comprises a view of the gallery based on which direction the avatar is facing;
detecting that the avatar is facing in front of a first image of the plurality of two-dimensional images of the gallery for a threshold period of time;
selecting the first image of the plurality of two-dimensional images to provide a linear view comprising a zoomed in version of the first image, responsive to the detecting that the avatar is facing in front of the first image for the threshold period of time;
providing the linear view of the first image comprising the zoomed in version of the first image including one or more directional keys to scroll through the plurality of two-dimensional images while remaining in the linear view, and wherein a remainder of the plurality of the two-dimensional images are not presently visible via the linear view;
providing the linear view of a second image responsive to detecting a scroll command comprising a selection of the one or more of direction keys while in the linear view, wherein the first image is located in a first location in the gallery and the second image is located in a second location different from the first location in the gallery;
detecting a request to exit the linear view while the second image is displayed in the linear view; and
displaying the avatar in the second location responsive to detecting the request to exit the linear view.

2. The method of claim 1, wherein the request to exit the linear view comprises a user command to return to the navigation view.

3. The method of claim 1, wherein the first image comprises a preview of a non-fungible token (NFT).

4. The method of claim 3, wherein the linear view includes ownership information about the NFT.

5. The method of claim 1, wherein the providing the linear view comprises providing a selectable scroll icon configured to scroll left and right through the plurality of two-dimensional images in addition to the one or more directional keys.

6. The method of claim 5, further comprising:
receiving a selection of the scroll icon; and
providing the linear view of a second image of the plurality of two-dimensional images.

7. The method of claim 1, wherein the first image comprises a video.

8. The method of claim 7, further comprising:
receiving a selection of the video in the linear view; and
playing the video responsive to the selection of the video in the linear view.

9. The method of claim 1, wherein the plurality of two-dimensional images comprise images retrieved from one website.

10. The method of claim 1, wherein the displaying the avatar in the second location comprises:
providing, responsive to detecting the request to exit the linear view, an option for a user to select whether to display the avatar in the first location or the second location; and
receiving a selection of the second location.

11. A system, comprising at least one processor configured to perform operations comprising:
providing a navigation view of a gallery of a plurality of two-dimensional images displayed in an immersive interface, the immersive interface including an avatar representing a user viewing the gallery, wherein the navigation view comprises a view of the gallery based on which direction the avatar is facing;
detecting that the avatar is facing in front of a first image of the plurality of two-dimensional images of the gallery for a threshold period of time;
selecting the first image of the plurality of two-dimensional images to provide a linear view comprising a zoomed in version of the first image, responsive to the detecting that the avatar is facing in front of the first image for the threshold period of time;
providing the linear view of the first image comprising the zoomed in version of the first image including one or more directional keys to scroll through the plurality of two-dimensional images while remaining in the linear view, and wherein a remainder of the plurality of the two-dimensional images are not presently visible via the linear view;

providing the linear view of a second image responsive to detecting a scroll command comprising a selection of the one or more of direction keys while in the linear view, wherein the first image is located in a first location in the gallery and the second image is located in a second location different from the first location in the gallery;

detecting a request to exit the linear view while the second image is displayed in the linear view; and displaying the avatar in the second location responsive to detecting the request to exit the linear view.

12. The system of claim 11, wherein the request to exit the linear view comprises a user command to return to the navigation view.

13. The system of claim 11, wherein the first image comprises a preview of a non-fungible token (NFT).

14. The system of claim 13, wherein the linear view includes ownership information about the NFT.

15. The system of claim 11, wherein the providing the linear view comprises providing a selectable scroll icon configured to scroll left and right through the plurality of two-dimensional images in addition to the one or more directional keys.

16. The system of claim 15, the operations further comprising:

receiving a selection of the scroll icon; and providing the linear view of a second image of the plurality of two-dimensional images.

17. The system of claim 11, wherein the first image comprises a video.

18. The system of claim 17, the operations further comprising:

receiving a selection of the video in the linear view; and playing the video responsive to the selection of the video in the linear view.

19. The system of claim 11, wherein the plurality of two-dimensional images comprise images retrieved from one website.

20. A non-transitory computer-readable medium having instructions stored thereon that, when executed by at last one computing device, cause the at last one computing device to perform operations comprising:

providing a navigation view of a gallery of a plurality of two-dimensional images displayed in an immersive interface, the immersive interface including an avatar representing a user viewing the gallery, wherein the navigation view comprises a view of the gallery based on which direction the avatar is facing;

detecting that the avatar is facing in front of a first image of the plurality of two-dimensional images of the gallery for a threshold period of time;

selecting the first image of the plurality of two-dimensional images to provide a linear view comprising a zoomed in version of the first image, responsive to the detecting that the avatar is facing in front of the first image for the threshold period of time; and providing the linear view of the first image comprising the zoomed in version of the first image including one or more directional keys to scroll through the plurality of two-dimensional images while remaining in the linear view, and wherein a remainder of the plurality of the two-dimensional images are not presently visible via the linear view;

providing the linear view of a second image responsive to detecting a scroll command comprising a selection of the one or more of direction keys while in the linear view, wherein the first image is located in a first location in the gallery and the second image is located in a second location different from the first location in the gallery;

detecting a request to exit the linear view while the second image is displayed in the linear view; and displaying the avatar in the second location responsive to detecting the request to exit the linear view.

\* \* \* \* \*

UNITED STATES PATENT AND TRADEMARK OFFICE
CERTIFICATE OF CORRECTION

PATENT NO. : 11,789,602 B1
APPLICATION NO. : 17/722987
DATED : October 17, 2023
INVENTOR(S) : Ng et al.

Page 1 of 1

It is certified that error appears in the above-identified patent and that said Letters Patent is hereby corrected as shown below:

In the Drawings

On Sheet 1 of 9, FIG. 1, and on the Title Page, the illustrative print figure, Tag 102, Line 1, delete "Galley" and insert -- Gallery --, therefor.

In the Specification

In Column 1, Line 32, after "is", insert -- an --.

In Column 3, Line 29, delete "galley" and insert -- gallery --, therefor.

In Column 7, Line 12, after "is", insert -- an --.

In Column 7, Line 43, delete "AR/NR" and insert -- AR/VR --, therefor.

In the Claims

In Column 14, Claim 20, Line 5, delete "last" and insert -- least --, therefor.

In Column 14, Claim 20, Line 6, delete "last" and insert -- least --, therefor.

Signed and Sealed this
Fifth Day of December, 2023

Katherine Kelly Vidal
*Director of the United States Patent and Trademark Office*